(12) United States Patent
Alvarez et al.

(10) Patent No.: US 8,819,909 B2
(45) Date of Patent: Sep. 2, 2014

(54) TOOL FOR ATTACHING VALVE KEYS TO THE VALVE OF THE ENGINE

(75) Inventors: Antonio Alvarez, Stolberg (DE);
Eberhard Ilg, Rainau-Saverwang (DE)

(73) Assignee: Elwema Automotive GmbH, Ellwangen (DE)

( * ) Notice: Subject to any disclaimer, the term of this patent is extended or adjusted under 35 U.S.C. 154(b) by 0 days.

(21) Appl. No.: 13/876,635

(22) PCT Filed: Sep. 27, 2011

(86) PCT No.: PCT/EP2011/004814
§ 371 (c)(1),
(2), (4) Date: May 23, 2013

(87) PCT Pub. No.: WO2012/041478
PCT Pub. Date: Apr. 5, 2012

(65) Prior Publication Data
US 2013/0232790 A1    Sep. 12, 2013

(30) Foreign Application Priority Data

Oct. 1, 2010  (EP) ..................................... 10186324

(51) Int. Cl.
  *B23P 19/04*    (2006.01)
  *B23P 15/00*    (2006.01)
  *F01L 3/10*    (2006.01)
(52) U.S. Cl.
  CPC ............. *B23P 15/001* (2013.01); *B23P 19/045* (2013.01); *F01L 3/10* (2013.01)
  USPC ........... 29/249; 29/213.1; 29/214; 123/90.28; 123/90.67
(58) Field of Classification Search
  USPC .......................... 29/213.1, 214, 249, 799, 809; 123/90.28, 90.67
  See application file for complete search history.

(56) References Cited

U.S. PATENT DOCUMENTS

| | | | | |
|---|---|---|---|---|
| 3,793,999 | A | * | 2/1974 | Seiler et al. ................. 123/90.67 |
| 4,494,306 | A | * | 1/1985 | Immonen ......................... 29/809 |

(Continued)

FOREIGN PATENT DOCUMENTS

| | | |
|---|---|---|
| DE | 19652711 A1 | 7/1998 |
| DE | 102008038290 A1 | 2/2010 |

(Continued)

OTHER PUBLICATIONS

Int'l Search Report and Written Opinion issued Nov. 8, 2011 in Int'l Application No. PCT/EP2011/004814.
Int'l Preliminary Report on Patentability issued Apr. 11, 2013 in Int'l Application No. PCT/EP2011/004814.

*Primary Examiner* — Richard Chang
(74) *Attorney, Agent, or Firm* — Panitch Schwarze Belisario & Nadel LLP

(57) ABSTRACT

A tool for attaching valve keys to a valve stem includes an elongated holder with a longitudinal axis, an inner hollow space and an end opening. An elongated core is arranged in the hollow space of the holder coaxially to the longitudinal axis. An elongated recess for receiving a substantial upper portion of the valve stem is provided in the end region of the core coaxially to the longitudinal axis. The recess of the core issues into the end opening and has a depth which is greater than or at least equal to the axial distance between the end and the annular groove of the valve stem. The core at least partially covers the annular groove, such that the valve keys can be supplied to the lateral surface of a valve stem underneath the annular groove and incorrect engagement can be avoided.

15 Claims, 2 Drawing Sheets

(56) References Cited

U.S. PATENT DOCUMENTS 5,097,579 A * 3/1992 Pringault .................. 29/214
5,761,785 A * 6/1998 Connolly .................. 29/249
6,223,426 B1 5/2001 Kimmelmann et al.
6,684,492 B2 * 2/2004 Tachibana et al. .............. 29/799

FOREIGN PATENT DOCUMENTS

| JP | 61-038831 A | 2/1986 |
| JP | 63-022236 A | 1/1988 |

* cited by examiner

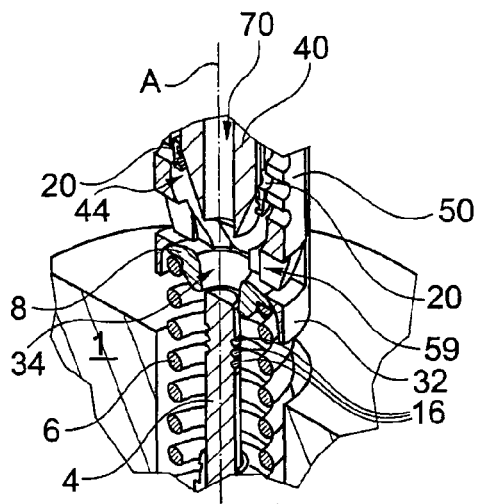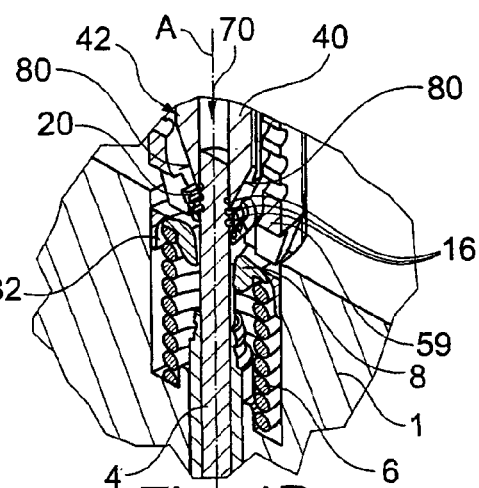
Fig. 4A  Fig. 4B
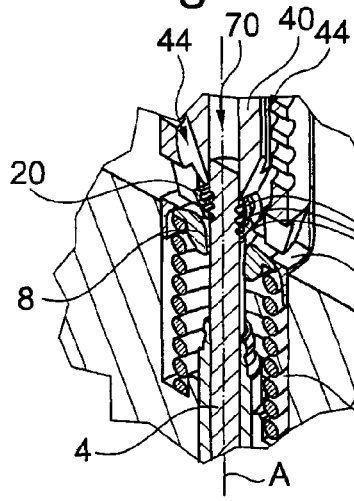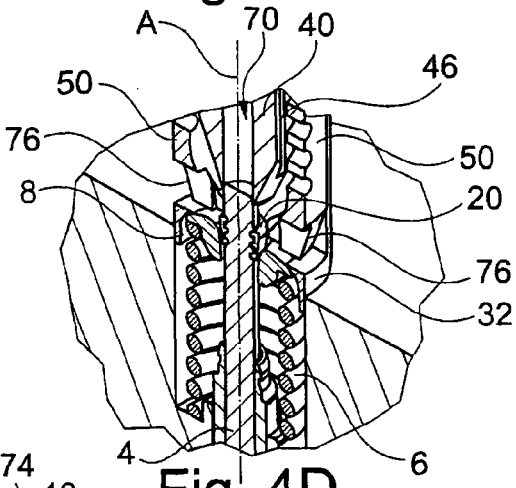
Fig. 4C  Fig. 4D
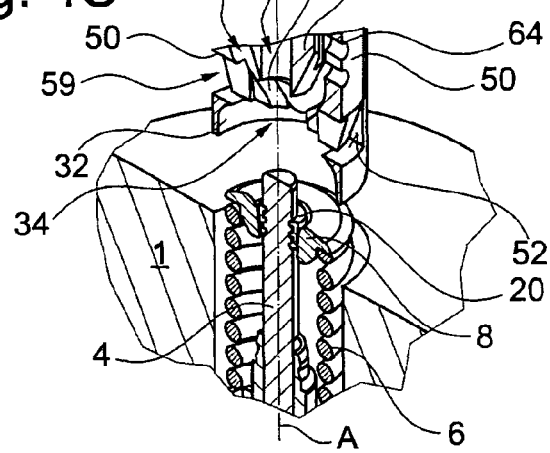
Fig. 4E

TOOL FOR ATTACHING VALVE KEYS TO THE VALVE OF THE ENGINE

CROSS-REFERENCE TO RELATED APPLICATIONS

This application is a Section 371 of International Application No. PCT/EP2011/004814, filed Sep. 27, 2011, which was published in the German language on Apr. 5, 2012, under International Publication No. WO 2012/041478 A1 and the disclosure of which is incorporated herein by reference.

BACKGROUND OF THE INVENTION

1. Technical Field

The present invention relates generally to a tool for fitting valve keys to control valves, in particular in the manufacture of internal combustion engines and generally reciprocating piston engines with valve control.

In particular, the present invention concerns a tool for feeding, fitting and introducing valve collets or keys between valve spring retainer and valve stem of a control valve, typically the intake or exhaust valve at the cylinder head of an internal combustion engine. Such a tool is also referred by those skilled in the art as a collet or key tool and is used in a fully automatic or semi-automatic machine for cylinder head assembly.

2. State of the Art

Control valves for reciprocating piston engines are spring-loaded by a valve spring for automatic return into the closed position. That valve spring is stressed between the reference support structure of the valve, generally a cylinder head, and a valve spring plate or retainer axially held to the valve stem (referred hereinafter as: spring retainer). Especially shaped holding keys, so called valve keys, are mounted between a suitable surface in the spring retainer and annular grooves on the valve stem, for axial fixing. The spring retainer is keyed to the stem by means of such valve keys.

So-called valve key guns have long been known for manual operation for fitting the valve keys. The present invention concerns, however, in particular a special key tool for an automated machine of the general kind as described, for example, in German patent specification DE 196 52 711.

DE 196 52 711 describes a key tool of the general kind set forth for fitting valve keys to a valve of an engine. It includes an elongate guide body or holder with a longitudinal axis and an end opening through which the end of the valve stem can slightly pass into the hollow space in the holder. Arrange internally in a hollow space in the holder is a pin-like elongate core coaxially relative to the longitudinal axis. The pin has an end region which is accessible to the upper end of the valve stem. For accurately positioning the tool in the working position required for introducing the valve keys relative to the valve stem, a recess receiving the upper end is milled in the lower end region. The reference position is produced by the tool abutting with that recess against the upper end of the valve. In addition, two transport passages which are symmetrical relative to the longitudinal axis are provided in the tool in accordance with DE 196 52 711, for feeding the valve keys. The transport passages extend in the direction of the longitudinal axis externally on the core to before the end region thereof.

In contrast to the state of the art at that time, the tool in accordance with DE 196 52 711 implements the function of automatically introducing the valve keys directly into their reference position on the valve stem. Therefore, additional aids like levers or pusher members, in particular for radially supplying the keys, are not required in that tool of the general kind specified. On the one hand, adjustability of the inwardly curved end region of the transport passages is required for automatically introducing the valve keys in accordance with DE 196 52 711. On the other hand, that principle is crucially dependent upon accurate positioning of the tool relative to the valve stem as the valve keys are to be introduced with their springs directly into the annular grooves (see FIG. 5 of DE 196 52 711). A certain susceptibility to trouble is already to be expected because of tolerances in manufacture of tool and valves, when adopting the reference position on the valve itself in accordance with DE 196 52 711. In fact it is not possible to reliably guarantee in that way that the valve keys are always introduced exactly in the reference position.

Japanese laid-open specification JP 61 038831 describes a further solution which manages without typical levers or pusher members for radially supplying the keys. The device of JP 61 038831 has a tool having a moveable core comprising two sleeves and push rods which are telescopically displaceable relative to each other and relative to the stationary holder. The outer push rod can receive or release the valve stem, as a hollow cylinder. The inner push rod is guided in the outer push rod and serves for determining the position. After release of the annular grooves on the valve stem by the outer push rod the keys are firstly coarsely fed and then precisely moved or inserted into the annular grooves by a return movement of the outer push rod by means of its especially shaped lower end. Susceptibility to error is also to be expected in a tool in accordance with JP 61 038831 because of the number of parts which are actuated and which have to be adjusted.

It will be appreciated that, considered from an economic point of view, a high level of reliability, that is to say low fault susceptibility, of tools and machines used is required quite generally in industrial manufacture and especially in automobile engine building. It is only in that way that the desired high production cycle rates can be achieved as permanently as possible and expenses caused by interruptions and wastage is avoided.

BRIEF SUMMARY OF THE INVENTION

Objective of the Invention

A first objective of a preferred embodiment of the present invention is to improve a tool of the general kind set forth for fitting valve keys, which ensures a lower level of susceptibility to error, in particular even with varying dimensions of valve stem or the tool components.

The above objective is attained by a tool as shown and described herein, and a method of using same for fitting valve keys to a valve as shown and described herein.

General Description of the Present Invention

According to a preferred embodiment of the present invention, the above objective is attained in that an elongate recess for receiving a substantial upper portion of the valve stem is provided in the end region of the core coaxially with the longitudinal axis. More precisely the recess is of a depth which is greater than or at least equal to the axial spacing between the annular groove and the end of the valve stem.

In that way the core of the tool, in particular the lower end region thereof, by receiving the upper portion of the valve stem, can cover at least one annular groove at least partially, preferably completely and still more preferably completely cover all annular grooves up to that most remote from the end of the valve stem. Accordingly, the valve keys are fed to the peripheral surface of a valve stem below the annular groove or grooves, at least below the upper annular groove or grooves. Therefore latching engagement of the valve keys into the annular grooves is effected in the sequence of the annular grooves which are successively cleared by the core in the return stroke of the tool.

Incorrect latching engagement is therefore no longer possible. The proposed configuration ensures that the lowermost spring of a valve key can always only latchingly engage into the lowermost annular groove of the valve stem for the valve stem firstly slides with the tool on the valve stem axially upwardly in the sense of axial relative movement. In addition, when using a sufficient over-stroke movement, the precise axial stroke movement of the tool and thus the tolerance in tool or valve stem manufacture become irrelevant as the proposed method can function satisfactorily even upon deeper or lesser engagement into the recess.

A simple configuration with only a few moveable parts and a minimum of actuation (actuators) is desirably achieved in that the at least transport passage is laterally delimited, on the outside and at least partially by a guide jaw which is arranged moveably relative to the holder, in particular pivotably transversely relative to the longitudinal axis. Lateral delimitation is effected on the inside at least partially by the elongate core which however is fixed in the hollow space in the holder, possibly interchangeably, but immovably in operation. That configuration permits definitive feed by virtue of the shaping of the at least one moveable jaw which finally clears the keys which are hooked in position, to remove the tool.

In a preferred embodiment of the present invention, the tool has two transport passages which are symmetrical relative to the longitudinal axis and two guide jaws arranged symmetrically relative to the longitudinal axis. The guide jaws can be respectively arranged in a side window of the holder and bear against the core in the operative position. Those guide jaws preferably each have a substantially cylindrical inner cover surface at a spacing relative to the core so that core and jaws form lateral delimitations of the two transport passages substantially over the length along which the keys slide past the core. With this preferred embodiment of the present invention, two keys, as are typically required, can be reliably supplied at the same time without increasing the number of parts to be actuated.

To provide an optimum feed with a low error rate the core preferably has two shaped grooves which are symmetrical relative to the longitudinal axis, each having a central projection and two lateral delimitation walls. Accordingly, the inside walls of such shaped grooves, together with the cover surfaces of the guide jaws, in a fixedly predetermined cross-section, preferably approximately C-shaped, can provide all the lateral boundaries of the transport passages. That has the advantage that upon a change in the type of key and/or valve, only the core and jaws of the tools have to be changed.

To ensure satisfactory removal of the tool after the feed operation in a simple manner each guide jaw is mounted pivotably to the holder. The pivotal movement particularly desirably takes place about an axis which is transverse or perpendicular to the longitudinal axis. To achieve the return of the jaws in a particularly simple fashion and without actuators they are biased by means of at least one elastic clamping means, preferably an O-ring which closely extends around the guide jaws and the holder, into a condition of abutment against the holder or core.

As a reliable configuration for the respective transport passage the end region of the core has two shallow inclines converging to the end opening symmetrically with respect to the longitudinal axis. Preferably, the surfaces of the inclines form with the longitudinal axis a respective angle in the region of 20-30°, preferably in the region of 22.5-27.5°. As a reliable configuration for the respective transport passage each guide jaw has an end portion with an inner sliding surface which in an upper region is in opposite relationship to the core, is firstly curved towards the longitudinal axis in a dome-shaped concave configuration and is convexly curved in a lower region relative to the end opening, preferably with a turning point below the end region of the core. Desirably a groove is further provided centrally in the end portion of each guide jaw transversely to the longitudinal axis so that the sliding surfaces have two inwardly disposed edges as support means for guiding the valve keys.

For connection to an actuating and feed device the holder preferably also has a mounting flange in opposite relationship to the end opening, with a connection for forming hoses to the guide passages so that the valve keys can be shot in with compressed air through the forming hoses and the guide passages. Desirably in the case of a pneumatic feed each guide jaw has at least one vent opening from its cover surface outwardly.

In a form which is desirable in terms of manufacture the core is in the form of a solid core and is provided in the lower region, as the recess, with a simple blind hole or blind bore. The inside diameter of the recess corresponds to the outside diameter of the valve stem plus minimal play for introducing/removing the valve stem so that centering of the valve stem can also be effected by the core.

In the typical case where the valve stem has at least two and in particular three annular grooves the recess is preferably of a depth equal to or larger than the axial spacing along the longitudinal axis between the end and that annular groove of the valve stem, which is at the greatest spacing from the end of the valve stem.

For reliably engaging the spring retainer the holder has a downwardly enlarging centering portion at its end and surrounding the end opening. To provide a reliable feed movement the end opening at the end of the holder, with guide jaws bearing against the core in the operative position, is of an inside diameter corresponding to the maximum outside diameter of the valve keys bearing against the valve stem, plus minimal play for introduction/removal.

The tool proposed according to a preferred embodiment of the present invention is characterized by a method procedure in which the upper portion of a valve stem is introduced axially into the recess in the core to such a depth that the core covers over at least one annular groove and preferably all annular grooves of the valve. A further characteristic is that thus, when the annular groove or grooves is or are covered over, the valve key or keys are supplied through the respective transport passage below the at least one annular groove to the peripheral surface of the valve stem. That already excludes the possibility of incorrect feed which regularly occurs in previously known tools, in particular with a pneumatic feed.

Then, in the method procedure or in operation the holder with the inwardly disposed core is moved axially away from the valve, in which case the valve keys are held at an include in front of the end region of the core and over the end opening in such a way that only the lower part, in particular the lowermost spring of the valve key, rubs against the peripheral surface. In that way, only the lowermost spring of the valve key can also latchingly engage into the lowermost annular groove of the valve stem, which is always first released by the core. This accordingly ensures a fault-free feed. For positional security, the keys are preferably fed by being shot by means of compressed air through the transport passages and are acted upon with compressed air until complete removal of the tool from the valve so that the keys are pressed against the valve stem and are held in position until latching engagement occurs.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIGS. 4A to 4E are a succession of perspective views in longitudinal section around an upper end of a valve stem to illustrate the method procedure when fitting valve keys with the tool shown in FIGS. 1-3.

DETAILED DESCRIPTION OF THE INVENTION

Figures 1, 2, 3:
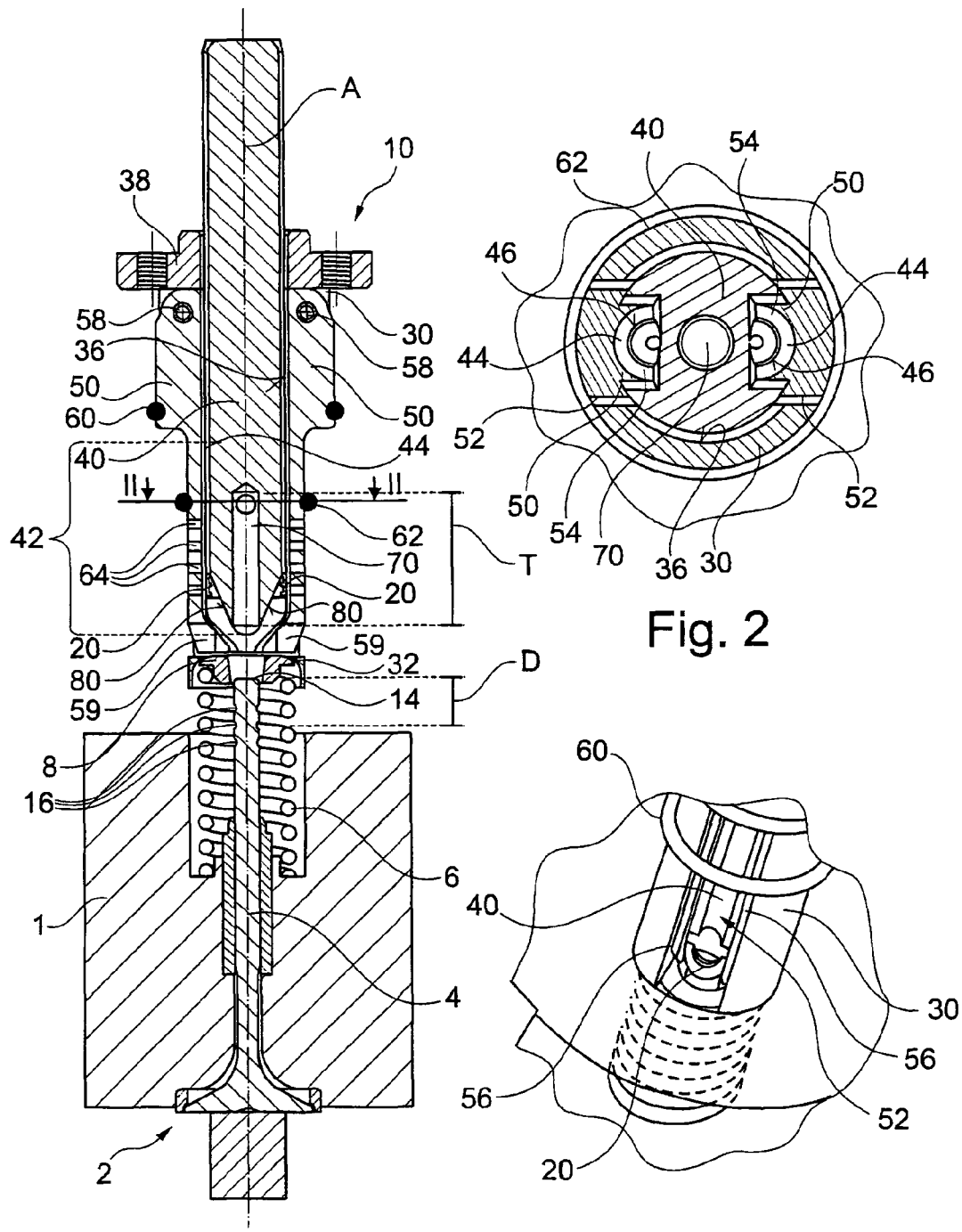
FIG. 1 is a longitudinal cross-sectional view of a tool for fitting valve keys in accordance with a preferred embodiment of the present invention.
FIG. 2 is a cross-sectional view through the tool along section line II-II in FIG. 1.
FIG. 3 is a perspective partly broken-away side view of a lower region of the tool.

Certain terminology is used in the following description for convenience only and is not limiting. The words "lower," "upper" and "front" designate directions in the drawings to which reference is made. The words "inwardly," "outwardly" "upwardly" and "downwardly" refer to directions toward and away from, respectively, the geometric center of the device, and designated parts thereof, in accordance with the present invention. Unless specifically set forth herein, the terms "a," "an" and "the" are not limited to one element, but instead should be read as meaning "at least one." The terminology includes the words noted above, derivatives thereof and words of similar import.

Referring to the drawings in detail, wherein like numerals indicate like elements throughout the several views, FIG. 1 diagrammatically shows a partial region of a cylinder head 1 around a valve 2. The valve 2 preferably includes a valve retainer for sealing on the seat ring as well as a valve stem 4, a valve spring 6 and a spring retainer 8. The arrangement of the valve 2 in FIG. 1 is typical in internal combustion engines. In known manner the valve stem 4 has an upper initially exposed end 14 and at least one and typically three axially displaced annular grooves 16 to which valve keys latchingly engage when properly fitted. FIG. 1 further shows in a preferred configuration of the tool according to the present invention, generally denoted by 10, for mounting valve keys 20 to the valve 2.

The tool 10 preferably has a lance-like, substantially cylindrical holder 30 with a longitudinal extent along a longitudinal axis A, as can be seen from FIGS. 1-3. At its lower end, the holder 3 has a concave centering portion 32 which enlarges downwardly in a dome shape or spherically for centering the spring retainer 8 when moving the tool 10 downwardly along the axis A (see FIG. 4E). An end opening 34 is provided in the centering portion 32 or in the end of the holder 30. Provided in the interior of the holder 30 is an approximately cylindrical hollow space 36, as can be seen from FIGS. 1-2. The end 14 of the valve stem 4 can be introduced into the holder 30 through the end opening 34, as can be seen from a comparison of FIG. 4A with FIG. 4B. At the upper end opposite to the end opening 34 the holder 30 has a mounting flange 38.

The tool 10 further has an elongate core 40 which is arranged in the hollow space 36 in the holder 30 coaxially with the longitudinal axis A and is fixed interchangeably but movably there. To the side of the end opening 34 the core 40 has an end region, generally denoted by 42 in FIG. 1. The valve stem 4 can be introduced with its upper end 14 through the end opening 34 to the end region 42 of the core 40 or into same, as described in greater detail hereinafter.

As can best be seen from FIG. 2 or FIGS. 4A-E, the tool 10 has two transport passages 44 which extend substantially in the direction of the axis A, more specifically externally on the core 40 downwardly to in front of the end region 42, that is to say into the proximity of the end opening 34. The two transport passages 44 are each of a point-symmetrical relationship with the axis A in cross-section, as shown in FIG. 2. The transport passages 44 serve for feeding valve keys 20 to the valve 2, more specifically to the valve stem 4 thereof, as described in greater detail hereinafter.

In addition FIGS. 1-2 and FIGS. 4A-E (omitted in FIG. 3) show two guide jaws 50 which are also arranged symmetrically relative to the longitudinal axis A, more specifically externally to the guide passages 44. The guide jaws 50 are at least partially let into correspondingly oppositely disposed side windows 52 (broken line in FIG. 2) of the holder 30. FIG. 3 shows one of the side windows 52 without the guide jaw 50 let thereinto. Each guide jaw 50 forms inwardly a cover surface 54 for laterally delimiting the corresponding guide passage 44. As shown in FIG. 2 therefore the guide jaws 50, more precisely the cover surfaces 54 thereof, together with the outside surface of the core 40, form the lateral delimiting boundaries (transversely relative to the direction of movement) of the two transport passages 44.

In that respect, FIG. 2 shows in particular the specific geometry of the core 40, such that the core 40 and the guide jaws 50 form the overall lateral boundaries of the transport passages 44. In other words, the holder 30 per se is not involved in guiding the valve keys 20 or forming the transport passages 44. Accordingly, in a situation involving a modified geometry of the valve keys 20, there is no need for complete replacement of the tool 10, but generally only replacement of the core 40 and the guide jaws 50 is required, which are interchangeably fixed to the holder 30. As can be seen from FIG. 2 the valve keys 22 are in cross-section substantially C-shaped or in the form of half a disk. The corresponding free cross-section of the transport passages 44 is preferably achieved on the one hand by the cylindrical configuration of the cover surface 54 and on the other hand by a suitable shaped groove or recess in the core 40.

The core 40 thus preferably has two shaped grooves 46 which are symmetrical relative to the longitudinal axis A and which together with the cover surfaces 54 form a free cross-section for the valve keys 20, which cross-section is C-like in cross-section and is substantially bridge-shaped. As shown in FIG. 2 each groove 46 has a central projection corresponding to the inside surface of the valve keys 20 and two lateral delimiting walls in a tangential direction around the axis A. Those delimiting walls form within the windows 52 a step 56 against which the guide jaws 50 bear firmly against the core 40 in the operative position. As can be seen from FIG. 2, the cover surfaces 54 of the guide jaws 50 project into the region between the lateral delimiting walls of the groove 46, whereby the cover surfaces 44 and the inside walls of the grooves 46 provide the overall lateral boundaries of the transport passages 44. The cross-section of the cover surfaces 54 is selected to correspond to the outside surface of the valve keys 20.

As shown in FIG. 1, the guide jaws 50 are mounted to the holder 30 by means of a clearance fit pivotably about a pin 58. The guide jaws 50 are thus pivotable about an axis transversely to the longitudinal axis and can thus possibly pivot outwardly away from the axis A. In order, nonetheless, to leave the fixedly predetermined shape of the guide passages 44 unaffected, the guide jaws 50 are biased into abutting contact with the core 40, more precisely the steps 46, by a spring means. That is preferably achieved by means of at least one O-ring 60, 62 which firmly embraces the holder 30 and the guide jaws 50. Suitable spring means thus act against opening pivotal movement of the guide jaws 50 about the pin 58. In the preferred configuration, there are two O-rings 60 and 62 for reasons of safety and torque. An upper O-ring 60 is stressed in an annular groove around an upper thicker portion of holder 30 and guide jaws 50. A lower O-ring 62 is stressed in an annular groove around a lower thinner portion, as shown in FIG. 1.

A dual function is thus attributed to the guide jaws 50. On the one hand the guide jaws, together with the grooves 46 in the core 40, by means of their cover surfaces 54, form the transport passages 44. On the other hand the guide jaws 50 which can be pivoted open against the spring loading permit enlargement of the end opening 34 in a trouble situation, that is to say they prevent breakage of the tool 10 if unexpectedly a valve key 20 would not properly come into latching engagement, for example in the event of a manufacturing fault in the annular grooves 16 or a valve key 20. The stressing force of the O-rings 60, 62 is accordingly so selected that the guide jaws 50 pivot open only upon jamming of a valve key 20. In normal use, that is to say when the guide jaws 50 bear against the steps 56, the end opening 34 at the end of the holder 30 is however of a diameter equal to the maximum outside diameter of the valve keys 20 bearing against the valve stem 4, plus a minimal play for insertion/removal of the valve stem 4 with valve keys 20 through the end opening 34.

Connections (not shown in greater detail) for connecting forming hoses to the guide passages 44 are provided in the mounting flange 38 in known manner. They serve for feeding the valve keys 20 by means of compressed air or for shooting them into position. Advantageously, the guide jaws 50, as a third function, each include one or more venting openings 64 from the inner cover surface 54 outwardly, as shown in FIG. 1. The corresponding transport passage 44 is vented through the venting openings 64 to provide for resistance-free feed of the valve keys 20. Before a further fourth function of the guide jaws 50 is explained however the configuration of the core 40 according to the invention will now be considered.

As can be clearly seen from FIGS. 1-2 and FIGS. 4A-E, provided in the end region 42 of the core 40 coaxially with the longitudinal axis A is an elongate recess 70. That recess serves to receive a substantial upper portion of the valve stem 4 in the core 40, more precisely in the functional end region 42 thereof, which can be defined by the depth of precisely that recess 70. The recess 70 opens into or is aligned coaxially with the end opening 34.

As can be seen from FIG. 1, the depth T of the recess 70 is markedly greater than the greatest axial spacing between the end 14 and an annular groove 16 of the valve stem 4, that is to say between the end 14 and the lowermost annular groove 16. At least the depth T according to the present invention, however, is equal to the axial spacing between the end 14 and the lowermost annular groove of the valve stem 4 so that all annular grooves 16 above the lowermost annular groove can be received by the core, that is to say covered over, and can be blocked from access. Thus, by means of a sufficient axial stroke movement (over-stroke movement) of the tool 10 it is possible to prevent the springs of the valve keys 20 wrongly coming into latching engagement, that is to say other than with the lowermost spring in the lowermost annular groove 16. On the other hand, in the return stroke movement, the annular grooves 16 are only successively cleared by the core 40. Typically a valve as can be seen from FIGS. 4A-E has three annular grooves and the depth T is so selected that all three annular grooves can be lowered sufficiently deeply into the recess (over-stroke movement) to increase the tolerance in respect of stroke movement and dimensional differences.

Accordingly, the valve keys 20 are not fed to the valve stem 4, as is usual in the state of the art (see DE 196 52 711), in their axial end position with the proposed tool 10. Rather, the proposed tool 10, by virtue in particular of the recess 70 of adequate depth T, permits the feed movement of the valve keys 20 below the lowermost annular groove 16, more specifically to the peripheral surface of the valve stem 4, and then successive clearing of individual annular grooves 16. Besides preventing incorrect latching engagement, this arrangement also achieves a higher level of fault tolerance in the axial direction as the precise position in respect of the feed to the peripheral surface is immaterial, insofar as there is an adequate over-stroke movement. The recess 70 in the lower end region 42 is preferably in the form of a blind bore or blind hole in the core 40 which at least in the end region comprises solid material. The inside diameter of the recess 70 is approximately equal to the outside diameter of the valve stem 4 plus minimal play for insertion/removal of the valve stem 4 into and out of the recess 70 plus tolerance which is possibly required.

As can be seen from FIG. 4B, the tool further preferably causes the valve keys 20 to bear or rub against the valve stem 4 only with their lowermost spring. That can preferably be achieved by the following features: as can be seen from FIG. 1, FIG. 3 and for example FIG. 4B the lower part of the end region 42 has externally and symmetrically relative to the longitudinal axis A two shallow inclines 80 which converge towards the end opening 34 or the mouth of the recess 70. The surfaces of those inclines 80 each form with the longitudinal axis A (smallest) angle in the region of 20-30° (20 through 30×Π/180 in circular measure) and preferably in the region of 22.5-27.5°. Corresponding inclines contribute to avoiding incorrect latching engagement of the valve keys. In addition, the inclines 70 cause fork-like movement over the annular grooves 16.

The following configuration of the guide jaws 50 is also preferred for suitably fitting the valve keys 20: each guide jaw 50 has an end portion 59 with a specially shaped curved inner sliding surface. As shown in FIG. 4E, each sliding surface has internally at the end portion 59 an upper region 72 which is disposed in opposite relationship to the respective incline 70 on the core 40 and is firstly concavely curved in a dome shape 25 towards the longitudinal axis A. In addition, the end portion 59 of each guide jaw 50 has a lower region 74 adjoining the end opening 34 and forming the latter together with the holder 30. The lower region 74 in contrast is curved not concavely but convexly. Preferably, the turning point between the concave region 72 and the convex region 74 is below the end region 42 of the core 40, which in practice delivers particularly good results in the feed of the valve keys 20. Finally, guidance for the valve keys 20 can also be optimized to the effect that a respective groove 76 (see FIG. 4D) is provided centrally in the end portion 59 of each jaw transversely relative to the longitudinal axis A so that the sliding surfaces in the region 72 and/or in the region 74 respectively have two inwardly disposed edges as supports for guiding the valve keys 20, whereby it is possible to avoid line support and thus tilting or flapping while in addition pressing of the valve keys 20 against the valve stem 4 is promoted by the flow of compressed air. Thus the lower end portion 59 of the guide jaws 50 also performs the function to be emphasized, of displacing the valve keys into a suitable inclined position to provide that they are pressed in the desired fashion against the peripheral surface of the valve stem 4, that is to say with the lower spring rubbing there against.

Finally, by means of the positions of the tool as shown in FIGS. 4A-E, which occur in succession in an operating sequence, the mode of operation will be discussed once again.

FIG. 4A corresponds to the feed movement of the tool 10 to the valve stem 4, wherein the spring retainer 8 is oriented by means of the centering portion 32 coaxially with the axis A. Over-pressing begins in that position, that is to say upsetting of the spring 6, which goes beyond operational compression. Two valve keys 20 are in movement towards the end portion 59 of the guide jaws 50.

FIG. 4B already shows the position in which the two valve keys 20 below the annular grooves 16 are fed through the respective transport passage 44 to the peripheral surface of the valve stem 4. By virtue of a specific configuration of the end portion 59 and the angle of the inclines 70 each valve key 20 is pressed against the valve stem 4 in such a way that only the lower spring rubs against the peripheral surface of the valve stem 4 beneath the annular grooves 16. The core 40 closes off at least the upper annular grooves 16. It is therefore to be emphasized that, for that purpose, the valve stem 4 must be sufficiently deeply introduced into the recess 70. In other words, the upper portion of the valve stem 4 is introduced axially into the recess 70 in the core 40 to such a depth that the core 40 covers over the at least one annular groove 16 (FIG. 4B), preferably all annular grooves 16 of the valve (not shown but preceding in the sequence at the position shown in FIG. 4B). It is to be noted that the valve keys can be held in the position of FIG. 4B by compressed air or also simply by the force of gravity.

FIG. 4C shows a position in which the tool 10 is already moved upwardly again in the return stroke movement. Because of the specific configuration of the end portion 59 and the angle of the inclines 70 each valve key 20 firstly only rubs with its lowermost spring against the peripheral surface of the valve stem 4. When the lowermost spring and the lowermost annular groove 16 in the valve stem 4 are in axial conformity, that spring of the respective valve key 20 then comes into latching engagement in the lowermost annular groove 16 as shown in FIG. 4C. It is to be noted that it is precisely only the lowermost annular groove 16 that is the single one to be firstly completely cleared in the return stroke movement, whereby incorrect, that is to say axially displaced latching engagement, is reliably prevented. As from that position shown in FIG. 4C the valve keys 20 do not move vertically upwardly any more so that there is a relative movement between the tool 10 and the valve keys 20. In that relative movement the core 40 and the guide jaws 50 are further moved upwardly and the valve key 20 is straightened up in that case. In that case the valve key 20 latches into the remaining annular grooves 16 which are successively and completely cleared by the core 40. Thus by virtue of the specific configuration of the end portion 39 of the guide jaws 50 and the geometry of the end region 42 of the core 40 the valve keys then pivot into the position shown in FIG. 4D.

FIG. 4D shows the valve keys 20 which are correctly latched in the annular grooves 16. It will be noted however that the spring retainer 8 is not yet in the position of use in which its inner opening surrounds the valve keys 20 and holds them fast to the valve stem 4, as shown in the end position in FIG. 4E.

FIG. 4E shows the end or starting position in which the valve keys 20 are fitted between the valve spring retainer and the valve stem and the tool can be used again for fitting valve keys in relation to a further valve to be assembled.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A tool for fitting valve keys to a valve of an engine, the engine having a valve stem with an upper end and at least one annular groove for fixing the valve keys, the tool comprising:
   an elongate holder with a longitudinal axis, an inner cavity and an end opening through which the upper end of the valve stem can be introduced into a hollow cavity in a holder;
   an elongate core arranged in the hollow cavity in the holder coaxially with the longitudinal axis and having an end region accessible through the end opening; and
   at least one transport passage extending in a direction of the longitudinal axis externally on the core and to before the end region of the core for feeding valve keys to a valve,
   wherein the at least one transport passage is laterally delimited at least partially by a guide jaw arranged moveably relative to the holder and at least partially by the elongate core which is fixed immovably in the hollow space in the holder, and
   wherein an elongate recess is provided in the end region of the core coaxially with the longitudinal axis for receiving a substantial upper portion of the valve stem, wherein the recess of the core opens into the end opening and is of a depth greater than or at least equal to an axial spacing between the end and the annular groove of the valve stem so that the end region, upon reception of the upper portion of a valve stem, at least partially covers over the at least one annular groove so that the valve keys can be fed beneath the at least one annular groove to a peripheral surface of a valve stem.

2. The tool as set forth in claim 1, further comprising:
   two transport passages arranged symmetrically relative to the longitudinal axis and two guide jaws arranged symmetrically relative to the longitudinal axis and respectively arranged in a side window of the holder, bear against the core in an operative position and have a substantially cylindrical inner cover surface at a spacing relative to the core,
   wherein the core and the jaws form lateral boundaries of the two transport passages.

3. The tool as set forth in claim 2, wherein the core has two shaped grooves symmetrical relative to the longitudinal axis, each groove having a central projection and two lateral delimiting walls, and wherein inside walls of the grooves together with the cover surfaces of the guide jaws in a fixedly predetermined cross-section provide all lateral boundaries of the transport passages.

4. The tool as set forth in claim 3, wherein each guide jaw is mounted pivotably to the holder about an axis transversely relative to the longitudinal axis, and wherein each guide jaw is stressed into abutting contact against the core by at least one elastic stressing apparatus.

5. The tool as set forth in claim 2, wherein the end region of the core has two shallow inclines symmetrically relative to the longitudinal axis which converge toward the end opening and have surfaces of the inclines which with the longitudinal axis respectively form an angle of approximately 20-30°.

6. The tool as set forth in claim 5, wherein each guide jaw includes an end portion with an inner sliding surface, which sliding surface is firstly concavely curved in a dome shape toward the longitudinal axis in an upper region which is in opposite relationship to the respective incline on the core and in a lower region is convexly curved relative to the end opening.

7. The tool as set forth in claim 2, wherein a groove is provided centrally in the end portion of each guide jaw transversely relative to the longitudinal axis so that the sliding surfaces have two inwardly disposed edges as supports for guiding the valve keys.

8. The tool as set forth in claim 2, wherein the holder further includes a mounting flange in opposite relationship to the end opening and has a connection for forming hoses to guide passages so that the valve keys can be shot with compressed air through the forming hoses and the guide passages, and wherein each guide jaw has at least one venting opening.

9. The tool as set forth in claim 1, wherein the core is in the form of a solid core and has in a lower region as the recess a blind bore having a inside diameter that corresponds to an outside diameter of the valve stem and has minimal play for introduction or removal of the valve stem.

10. The tool as set forth in claim 1, wherein the valve stem has at least two annular grooves and the recess is of a depth which is equal to or greater than the axial spacing along the longitudinal axis between the end and that annular groove of the valve stem, which is at the largest axial spacing relative to the end.

11. The tool as set forth in claim 1, wherein the holder at the end surrounding the end opening is provided with a downwardly enlarging centering portion for centering a spring retainer.

12. The tool as set forth in claim 1, wherein the end opening at the end of the holder, with the guide jaws bearing against the core, has an inside diameter that corresponds to a maximum outside diameter of the valve keys bearing against the valve stem and has minimal play for insertion or removal.

13. A method of fitting valve keys between a spring retainer and a valve stem of an inlet or exhaust valve on a cylinder head of an internal combustion engine using a tool wherein the holder with internally disposed core is fed axially to the valve, the tool comprising:

an elongate holder with a longitudinal axis an inner cavity and an end opening through which the upper end of the valve stem can be introduced into a hollow cavity in a holder;

an elongate core arranged in the hollow cavity in the holder coaxially with the longitudinal axis and having an end region accessible through the end opening; and at least one transport passage extending in a direction of the longitudinal axis externally on the core and to before the end region of the core for feeding valve keys to a valve, wherein the at least one transport passage is laterally delimited at least partially by a guide jaw arranged moveably relative to the holder and at least partially by the elongate core which is fixed immovably in the hollow space in the holder, and wherein an elongate recess is provided in the end region of the core coaxially with the longitudinal axis for receiving a substantial upper portion of the valve stem, wherein the recess of the core opens into the end opening and is of a depth greater than or at least equal to an axial spacing between the end and the annular groove of the valve stem so that the end region, upon reception of the upper portion of a valve stem, at least partially covers over the at least one annular groove so that the valve keys can be fed beneath the at least one annular groove to a peripheral surface of a valve stem, the method comprising:

centering the spring retainer around the end opening of the holder by a centering portion and a spring of the valve being compressed;

axially introducing the upper portion of a valve stem into the recess in the core to such a depth that the core covers over the at least one annular groove; and feeding, while the at least one annular groove is covered, two valve keys to the peripheral surface of the valve stem through the transport passage below the at least one annular groove.

14. The method as set forth in claim 13, further comprising:

pressing the holder with the internally disposed core axially away from the valve, wherein the valve keys are held at an incline in front of the end region of the core and over the end opening in such a way that only a lowermost spring of the valve key rubs against the peripheral surface, whereby only a lowermost spring of the valve key latches into a lowermost annular groove of the valve stem.

15. The method as set forth in claim 13, wherein the valve keys are shot by compressed air through the transport passage and are acted upon with compressed air and are pressed against the valve stem until the tool is completely removed from the valve.

* * * * *